(12) United States Patent
Pothula et al.

(10) Patent No.: US 12,694,354 B2
(45) Date of Patent: Jul. 28, 2026

(54) SYSTEMS AND METHODS FOR CONVERTING DIAGRAMS TO WORKFLOWS

(71) Applicant: ServiceNow, Inc., Santa Clara, CA (US)

(72) Inventors: Suneela Pothula, Hyderabad (IN); Sravan Kumar Laddagiri, Hyderabad (IN); Gnana Swaroop Thummalapalli, Hyderabad (IN); Alberto Alvarado Jiminez, San Diego, CA (US); Satya Karthik Adabala, Secunderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 42 days.

(21) Appl. No.: 18/676,030

(22) Filed: May 28, 2024

(65) Prior Publication Data

US 2025/0371469 A1      Dec. 4, 2025

(51) Int. Cl.
G06Q 10/0633      (2023.01)

(52) U.S. Cl.
CPC ............................... G06Q 10/0633 (2013.01)

(58) Field of Classification Search
CPC ......................................... G06Q 10/00–50/00
USPC .............................................. 705/7.11–7.42
See application file for complete search history.

(56) References Cited

U.S. PATENT DOCUMENTS

| | | | | | |
|---|---|---|---|---|---|
| 6,424,948 B1 * | 7/2002 | Dong | ..................... | G06Q 10/10 |
| | | | | 705/7.12 |
| 6,662,199 B1 * | 12/2003 | Flight | ..................... | G06Q 10/06 |
| | | | | 707/999.1 |

| | | | | |
|---|---|---|---|---|
| 11,372,380 B2 * | 6/2022 | Iyer | ......................... | G06N 20/00 |
| 12,008,332 B1 * | 6/2024 | Gardner | ................... | G06F 40/56 |
| 12,135,949 B1 * | 11/2024 | Cameron | ................ | G06F 40/40 |
| 12,169,802 B1 * | 12/2024 | Eldan | .................... | G06F 40/186 |
| 12,197,560 B1 * | 1/2025 | Eilon | .................... | G06F 3/0486 |
| 2003/0083910 A1 * | 5/2003 | Sayal | ..................... | G06Q 10/10 |
| | | | | 717/102 |

(Continued)

FOREIGN PATENT DOCUMENTS

| | | | | | |
|---|---|---|---|---|---|
| CN | 112668988 A | * | 4/2021 | ............. | G06N 20/00 |
| CN | 118551022 A | * | 8/2024 | ......... | G06Q 10/0633 |
| EP | 1978758 A1 | * | 10/2008 | ........... | H04Q 3/0054 |
| JP | 2024096684 A | * | 7/2024 | ........... | G06Q 10/103 |

OTHER PUBLICATIONS

Zeng, Zhen, et al. "FlowMind: automatic workflow generation with LLMs." Proceedings of the Fourth ACM International Conference on AI in Finance. 2023. (Year: 2023).*

(Continued)

*Primary Examiner* — Alan S Miller
(74) *Attorney, Agent, or Firm* — FLETCHER YODER PC

(57)          ABSTRACT

A method includes receiving data representative of a diagram, converting the data to a large language model (LLM) prompt, providing the LLM prompt to an LLM, receiving, from the LLM, based on the LLM prompt, a skeleton workflow, wherein the skeleton workflow includes a placeholder activity, and wherein the placeholder activity includes a placeholder value for a property of the placeholder activity, and generating a workflow based on the skeleton workflow and the data, wherein generating the workflow includes defining the placeholder value for the property of the placeholder activity based on the data.

20 Claims, 14 Drawing Sheets

(56)  References Cited

U.S. PATENT DOCUMENTS

| | | | | |
|---|---|---|---|---|
| 2010/0241990 | A1* | 9/2010 | Gabriel | G06Q 10/06 |
| | | | | 715/810 |
| 2011/0113008 | A1* | 5/2011 | Jafri | G06F 16/9535 |
| | | | | 709/206 |
| 2012/0060155 | A1* | 3/2012 | Keys | G06F 9/541 |
| | | | | 718/100 |
| 2020/0210911 | A1* | 7/2020 | Kim | G06Q 10/0633 |
| 2022/0229636 | A1* | 7/2022 | Nayak | G06Q 10/0633 |
| 2023/0385085 | A1 | 11/2023 | Singh et al. | |
| 2023/0393903 | A1* | 12/2023 | Kumar | G06F 9/5038 |
| 2023/0394439 | A1* | 12/2023 | Zhou | G06Q 10/0633 |
| 2023/0418966 | A1* | 12/2023 | Pandey | G06F 9/4881 |
| 2024/0095463 | A1* | 3/2024 | Leary | G06F 40/20 |
| 2024/0134874 | A1* | 4/2024 | Blonski | G06F 3/04842 |
| 2024/0338248 | A1* | 10/2024 | Bose | G06F 9/451 |
| 2024/0340302 | A1* | 10/2024 | Wang | G06N 20/00 |
| 2025/0200475 | A1* | 6/2025 | Zhang | G06F 8/30 |

OTHER PUBLICATIONS

Conrardy, Aaron, and Jordi Cabot. "From image to UML: First results of image based UML diagram generation using llms." arXiv preprint arXiv:2404.11376 (2024). (Year: 2024).*

Herwanto, Guntur Budi. "Automating data flow diagram generation from user stories using large language models." 7th Workshop on Natural Language Processing for Requirements Engineering. 2024. (Year: 2024).*

Nishat, Atika, and Zillay Huma. "Leveraging Generative AI for Automated Infrastructure-as-Code Generation in Cloud Systems." Global Knowledge Academy 4.4 (2023): 8-13. (Year: 2023).*

Khalfallah, M. et al., "Generating Executable Workflows from Solution Plans," 2015 IEEE International Conference on Web Services, Jun. 27, 2015, 8 pages.

Baeke, G., "Writing your first flow with Prompt Flow in Visual Studio Code," https://blog.baeke.info/2023/12/12/writing-your-first-flow-with-prompt-flow-in-visual-studio-code/, Dec. 12, 2023, 33 pages.

Yuzhe Cai et al: "Low-code LLM: Visual 1-20 Programming over LLMs", arxiv.org, Cornell University Library, 201 Olin Library Cornell University Ithaca, NY 14853, Apr. 17, 2023 (Apr. 17, 2023), XP091486335.

Tyler Angert et al: "Spellburst: A Node-based Interface for Exploratory Creative Coding with Natural Language Prompts", arxiv.org, Cornell University Library, 201 Olin Library Cornell University Ithaca, NY 14853, Aug. 7, 2023 (Aug. 7, 2023), XP091588917.

* cited by examiner

SYSTEMS AND METHODS FOR CONVERTING DIAGRAMS TO WORKFLOWS

TECHNICAL FIELD

The present disclosure relates generally to designing workflows, and more specifically to reducing resources utilized in designing workflows.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, as well as IT infrastructure, such as routers, load balancers, firewalls, switches, etc.) and software resources (e.g. productivity software, database applications, large language models (LLMs), generative artificial intelligence (AI) applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing-based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

In cloud-based architectures, a web browser or native application is often used on the client side to access cloud-based applications and resources. For example, an enterprise or other organization may utilize cloud computing resources to design workflows for processes that are performed by members of the enterprise or organization during operation. However, generating and modifying workflows for processes can be tedious and time consuming. Typically, workflow editing tools are used to generate a workflow from scratch, based on inputs received from multiple user and/or administrator profiles or personas having different levels and combinations of permissions. The workflow editing tool typically builds a workflow activity-by-activity. For each activity in the workflow, the workflow editing tool specifies, or receives inputs specifying, the properties of the activity. Building workflows is a time-consuming process that may cause inefficient utilization of computing resources, as well as errors in the workflow that may prevent the workflow from executing to completion and/or may cause inefficient execution of the workflow. Techniques for making the creation of workflows faster, more efficient, and less prone to errors are needed. Faster and more efficient workflow generation is associated with lower processor utilization and reduces computational costs.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a method includes receiving data representative of a diagram, converting the data to a large language model (LLM) prompt, providing the LLM prompt to an LLM, receiving, from the LLM, based on the LLM prompt, a skeleton workflow, wherein the skeleton workflow includes a placeholder activity, and wherein the placeholder activity includes a placeholder value for a property of the placeholder activity, and generating a workflow based on the skeleton workflow and the data, wherein generating the workflow includes defining the placeholder value for the property of the placeholder activity based on the data.

In another embodiment, a system includes processing circuitry and a memory, accessible by the processor. The memory stores instructions that, when executed by the processing circuitry, cause the processing circuitry to execute a client instance. The client instance is configured to receive, from a source external to the client instance, data representative of a diagram, convert the data to a large language model (LLM) prompt, provide the LLM prompt to an LLM, receive, from the LLM, based on the LLM prompt, a skeleton workflow, wherein the skeleton workflow includes a placeholder activity, and wherein the placeholder activity includes a placeholder value for a property of the placeholder activity, generate a workflow based on the skeleton workflow and the data, wherein generating the workflow includes defining the placeholder value for the property of the placeholder activity based on the data, and transmit a representation of the workflow to the source external to the client instance.

In a further embodiment, a non-transitory, computer readable medium comprising instructions that, when executed by processing circuitry, cause the processing circuitry to receive data representative of a diagram, convert the data to a large language model (LLM) prompt, provide the LLM prompt to an LLM, receive, from the LLM, based on the LLM prompt, a skeleton workflow, wherein the skeleton workflow includes a placeholder activity, and wherein the placeholder activity includes a placeholder value for a property of the placeholder activity, and generate a workflow based on the skeleton workflow and the data, wherein generating the workflow includes defining the placeholder value for the property of the placeholder activity based on the data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
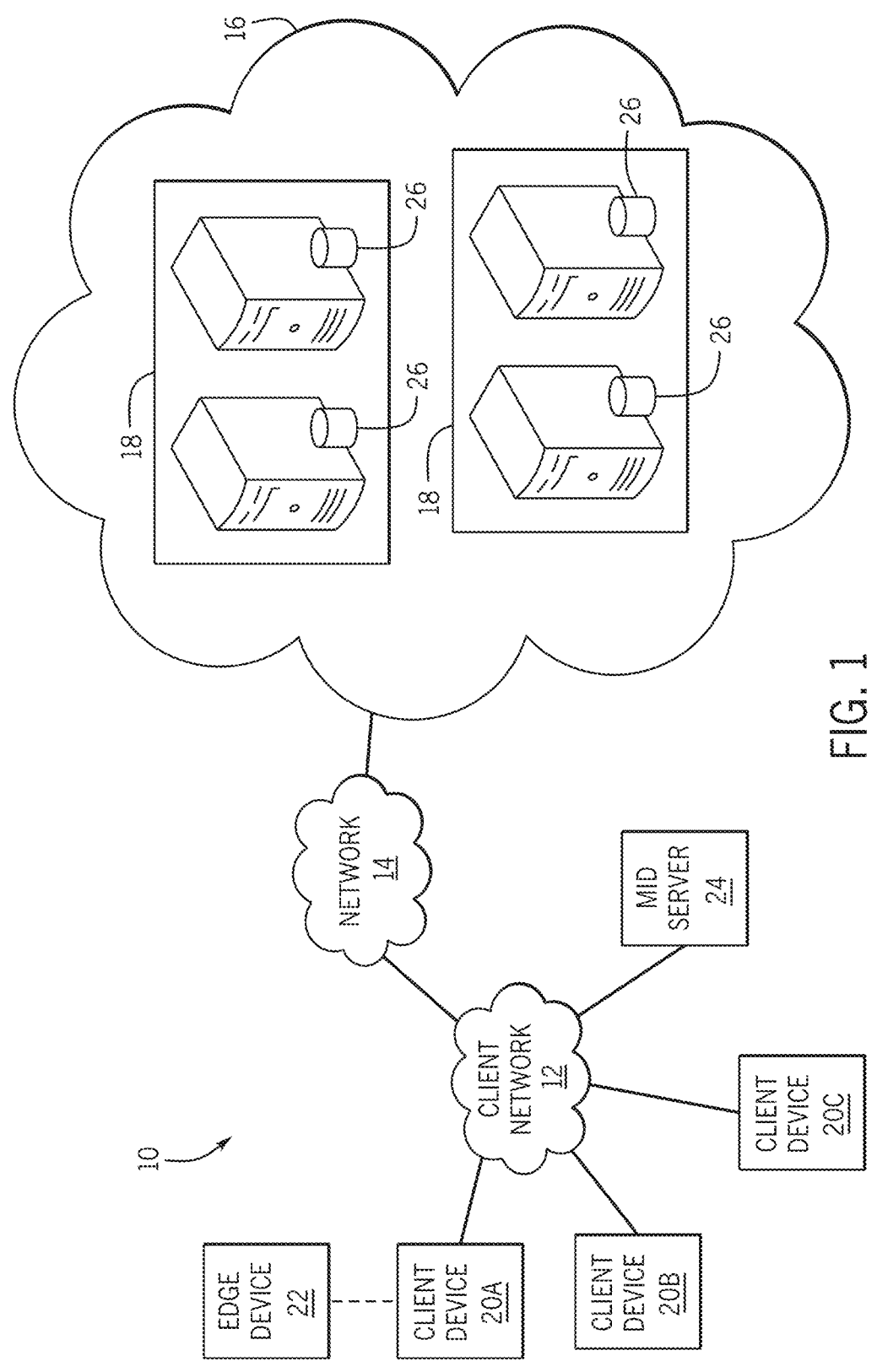
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Typically, workflow editing tools are used to generate a workflow from scratch, based on inputs received from multiple user and/or administrator profiles or personas (e.g., development, business analysis, process administrator, information technology (IT) administrator, end user, etc.) having different levels and combinations of permissions. Workflows may be generated based on what activities are to be performed during the workflow, stages (e.g., groupings) of activities within the workflow, how some activities within the workflow may be dependent on outputs from other activities in the workflow, or from external sources (e.g., a database, approval from a user profile, activities from other workflows, etc.), the order of activities within the workflow, whether activities can be performed in parallel, and so forth. The workflow editing tool typically builds a workflow activity-by-activity. For each activity in the workflow, the workflow editing tool specifies, or receives inputs specifying, the properties of the activity, such as inputs, outputs, actions that take place to generate the outputs based on the inputs, a label, a description, rules to apply during performance of the activity, triggers that initiate the activity, advanced properties of the activity, and so forth.

Even in low-code or no-code environments, building workflows using a series of graphical user interfaces (GUIs) with characteristics selected from groups of available options (e.g., drop-down menus), is a time-consuming process that may cause inefficient utilization of computing resources, as well as errors in the workflow that may prevent the workflow from executing to completion and/or may cause inefficient execution of the workflow. Techniques for making the creation of workflows faster, more efficient, and less prone to errors are needed. Faster and more efficient workflow generation is associated with lower processor utilization and reduces computational costs.

Various embodiments disclosed herein are directed to a workflow editing tool that builds workflows using large language models (LLMs) based on diagrams received from sources external to a client instance running the workflow editing tool. Specifically, a payload representative of a diagram is received from a source external to the client instance (e.g., via an API or a plugin). The payload may be in the form of JSON, text, images, and so forth. The client instance applies a processing layer to convert the payload into a text-based (e.g., natural language) LLM prompt and provides the prompt to an LLM. In some embodiments, conversion of the payload to an LLM prompt may involve an additional LLM, such as when the payload includes one or more images. The LLM generates a skeleton workflow, including multiple placeholder activities, which may or may not be grouped into stages, based on the prompt. The client instance converts the skeleton workflow into a workflow by specifying various characteristics of the placeholder activities based on the characteristics of the payload. The workflow may be in JSON, BPML, BPEL, or some other format. The workflow may then appear as a usable workflow in the client instance. Further, the workflow may be exported to the external source such that the workflow may be viewed and/or modified in one or more applications running on the external source. Accordingly, the workflow in the client instance and the external source may be synchronized such that workflow modifications in the client instance are synchronized to the workflow instantiated on the external source, and workflow modifications in the external source are synchronized to the workflow instantiated on the client instance.

Use of the disclosed techniques may result in faster and more computationally efficient creation of workflows, as well as more accurate workflows with fewer errors. Further, because the disclosed techniques use a more holistic approach to generating workflows compared to workflows generated based on inputs from multiple profiles or personas having different perspectives, as well as different levels and combinations of permissions, the disclosed techniques result in workflows that are more resource efficient to execute.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20A, 20B, 20C may be computing systems and/or other types of computing devices generally referred to as Internet of Things (IoT) devices that access cloud computing services, for example, via a web browser application or via an edge device 22 that may act as a gateway between the client devices 20A, 20B, 20C and the platform 16. FIG. 1 also illustrates that the client network 12 includes an administration or managerial application, device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to the network 14, which may include one or more computing networks, such as other LANs, wide area networks (WAN), the Internet, and/or other remote networks, to transfer data between the client devices 20A, 20B, 20C and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20A, 20B, 20C via the client network 12 and network 14. The network hosting the platform 16 provides additional computing resources to the client devices 20A, 20B, 20C and/or the client network 12. For example, by utilizing the network hosting the platform 16, users of the client devices 20A, 20B, 20C are able to build and execute applications and/or workflows for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
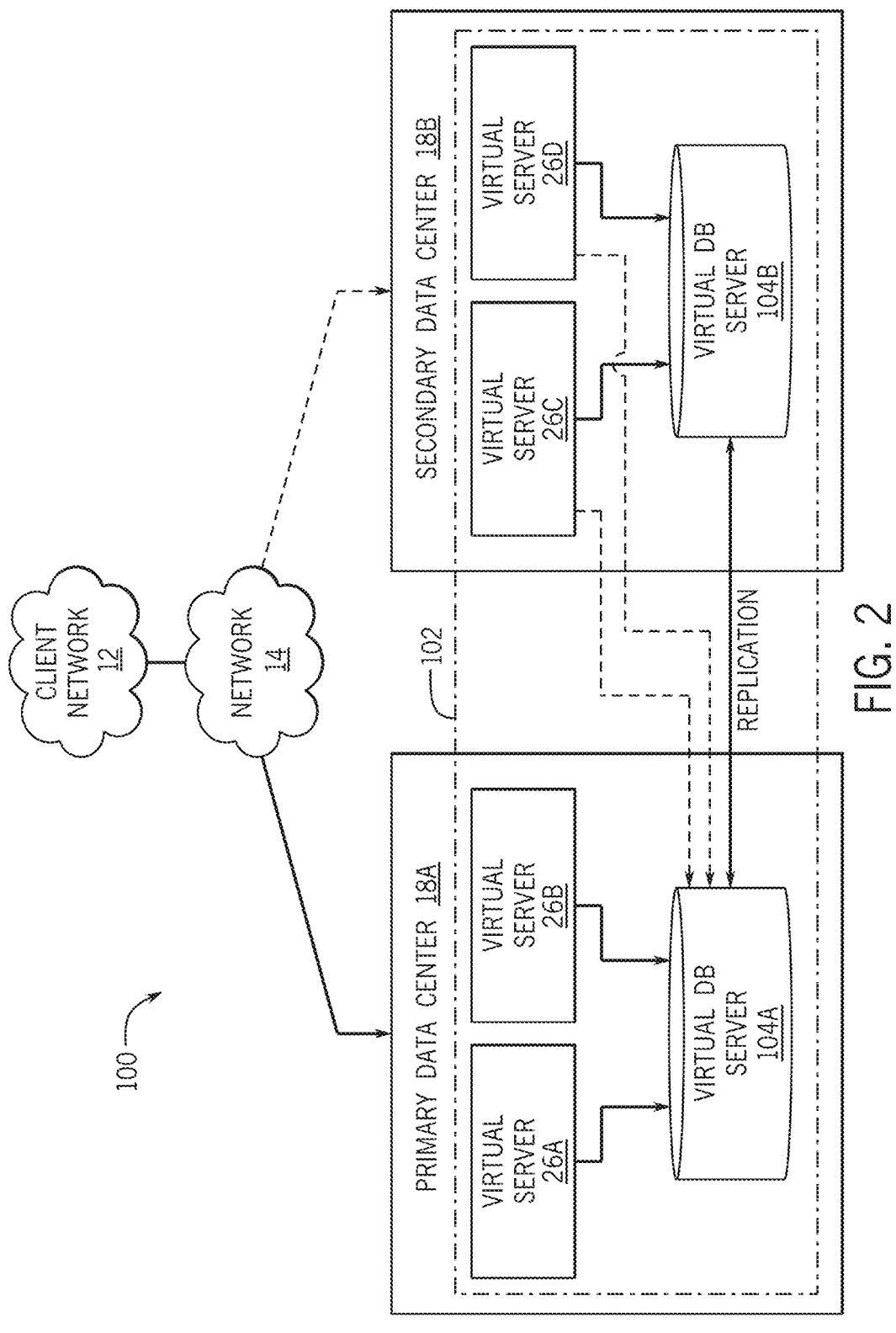
FIG. 2 is a schematic of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, this disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, edge devices, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
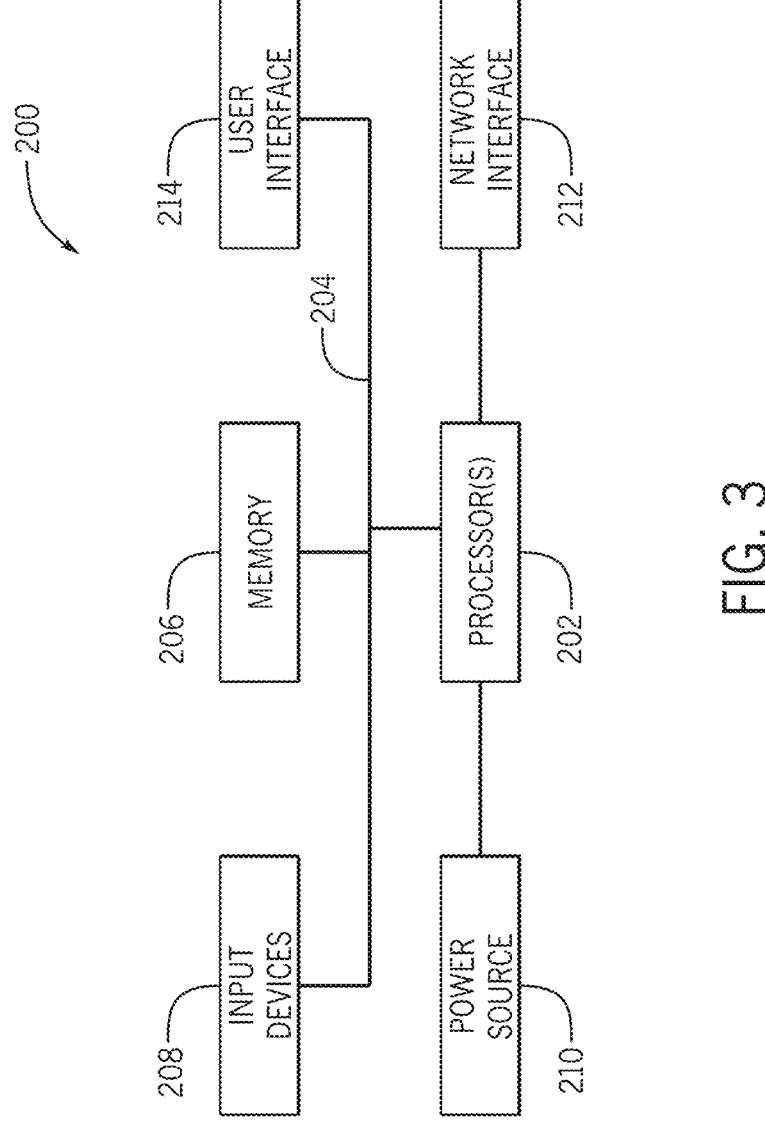
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computing system 200 may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
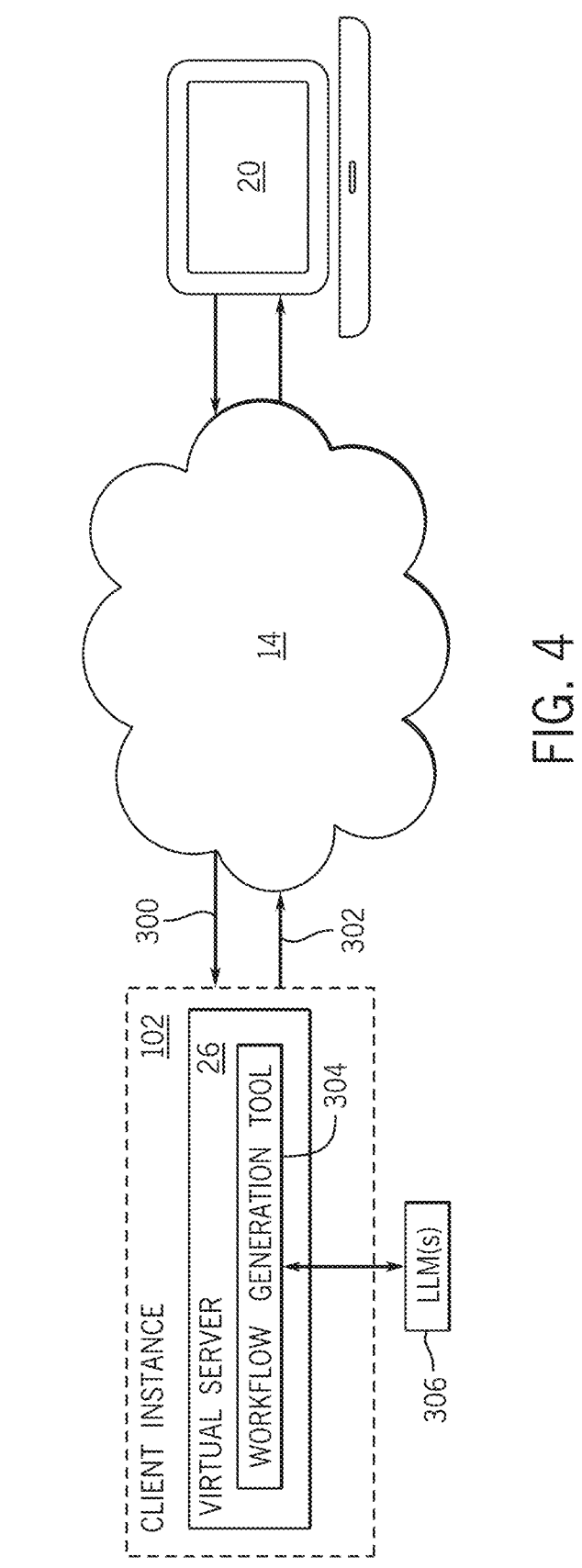
FIG. 4 is a block diagram illustrating a virtual server that supports and enables a client instance, in accordance with aspects of the present disclosure.

With the preceding in mind, FIG. 4 is a block diagram illustrating an embodiment in which a virtual server 26 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser or a native application running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

As shown, the client device 20 may interact with the client instance 102 by providing inputs 300, to which the client instance 102 may respond with outputs 302. In the embodiment shown in shown in FIG. 4, the virtual server 26 of the client instance 120 may run a workflow editing tool 304, which may be a software application defined by code, accessible via a native application or web browser of the client device 20. Accordingly, the inputs 300 may include inputs requesting a workflow, specifying one or more characteristics of a workflow, providing feedback on a generated workflow, requesting modifications to a workflow, and so forth. Correspondingly, the outputs 302 may include requested workflows (e.g., skeleton workflows, partially complete workflows, complete workflows, etc.), responses to inputs 300, questions, and so forth. The workflow editing tool 304 may utilize one or more large language models 306 (LLMs), which may be accessible to the client instance 102 (e.g., stored in another instance, stored on the same instance, stored in the cloud, stored on one or more server, etc.), to generate some or all of the outputs 302. As used herein, a large language model (LLMs) is a probabilistic model of a natural language used for general-purpose language generation. LLMs typically include one or more artificial neural networks having a transformer-base architecture. LLMs learn statistical relationships from text documents through training processes that may be supervised, semi-supervised, or self-supervised. During training, LLMs may learn syntax, semantics, and/or ontology. LLMs, when used for text generation, receive an input text and iteratively predict the next word or token. It should be understood that the client instance 102 shown in FIG. 4 may be utilized by the client device 20 for other tasks associated with workflows, as well as tasks beyond the scope of workflow generation and modification.

Typically, workflow editing tools are used to generate a workflow from scratch, based on inputs received from multiple user and/or administrator profiles or personas (e.g., development, business analysis, process administrator, information technology (IT) administrator, end user, etc.) having different levels and combinations of permissions. Workflows may be generated based on what activities are to be performed during the workflow, stages (e.g., groupings) of activities within the workflow, how some activities within the workflow may be dependent on outputs from other activities in the workflow, or from external sources (e.g., a database, approval from a user profile, activities from other workflows, etc.), the order of activities within the workflow, whether activities can be performed in parallel, and so forth. The workflow editing tool typically builds a workflow activity-by-activity. For each activity in the workflow, the workflow editing tool specifies, or receives inputs specifying, the properties of the activity, such as inputs, outputs, actions that take place to generate the outputs based on the inputs, a label, a description, rules to apply during performance of the activity, triggers that initiate the activity, advanced properties of the activity, and so forth.

Even in low-code or no-code environments, building workflows using a series of graphical user interfaces (GUIs) with characteristics selected from groups of available options (e.g., drop-down menus), is a time-consuming process that may cause inefficient utilization of computing resources, as well as errors in the workflow that may prevent the workflow from executing to completion and/or may cause inefficient execution of the workflow.

The presently disclosed workflow editing tool 304 may be configured to receive inputs 300, such as diagrams from external sources (e.g., applications running outside the client instance), and use the LLMs 306 to automatically build workflows based on the inputs. The workflow editing tool 304 may receive a payload including data representative of a diagram, such as a flow diagram, from an external source, such as an application running outside the client instance. The payload may include a text description of the diagram that breaks the diagram into a series of chronological steps based on an analysis of the image. The text description of the payload may also include logical operations tying the various steps together, notes about anomalies in the diagram, assumptions made, and so forth. In some embodiments, the payload may include the image or some other graphical representation of the diagram. For example, the diagram may have been generated in and exported from an application running on the client device 20. The workflow editing tool 304 utilizes the one or more LLMs 306 to generate a skeleton workflow, including multiple placeholder activities, which may or may not be grouped into stages, or a complete workflow, as an output 302.

As used herein, a workflow is a sequence of activities or steps that combine to form a process performed in the operation of an enterprise or organization. Correspondingly, a skeleton workflow is a workflow made up of multiple activities wherein at least one of the multiple activities has undefined or unspecified properties or parameters. The one or more LLMs 306 may be trained, for example, on existing workflows (e.g., within the enterprise, across an industry, across multiple industries, etc.), business process model and notation (BPMN) conventions, industry standard operating procedures, industry best practices, publicly available information, publications, data from the Internet, and so forth. In some embodiments, the one or more LLMs 306 may be "off the shelf" or "out of the box" LLMs 306 provided by a service provider and not unique to the client instance 102. However, in other embodiments, the LLMs may be customized to the client instance 102, either with specific training, specific customized settings, or both.

The workflow editing tool 304 may use the one or more LLMs 306 to build the skeleton workflow placeholder-activity-by-placeholder-activity. Each placeholder activity may include proposed placeholder values for one or more properties of the corresponding placeholder activity. For example, a placeholder activity of the skeleton workflow may include proposed placeholder values for inputs, outputs, actions that take place to generate the outputs based on the inputs, a label, a description, rules to apply during performance of the activity, triggers that initiate the activity, advanced properties of the activity, or some combination thereof.

In some embodiments, the workflow editing tool 304 may be configured to convert the skeleton workflow generated by the LLM 306 into a complete workflow (e.g., a workflow in which all of the properties of all of the activities are fully defined) based on the payload. As used herein, a complete workflow is a workflow having multiple activities, wherein all of the activities in the workflow have fully defined properties. Accordingly, none of the activities in a complete workflow have undefined parameters. The workflow editing tool 304 may transmit the workflow to the client device 20 as an output 302 for display via the client device 20 by way of a native application (e.g., a corresponding client-side version of the workflow editing tool 304) or a web browser. The client device 20 may receive inputs requesting modifications to or making edits to the workflow, and/or providing feedback to the workflow editing tool. In such embodiments, edits/modifications to the complete workflow may be received (e.g., add/remove activities, specify different values for activity properties, etc.), which may cause the workflow editing tool to make changes to the workflow based on the feedback received via the workflow editing tool. The edits/modifications may be made to a local copy of the workflow stored on the client device 20, or transmitted by the client device 20 to the client instance 102 as inputs 300 for modification of a copy of the skeleton workflow stored by the client instance 102.

Figure 5:
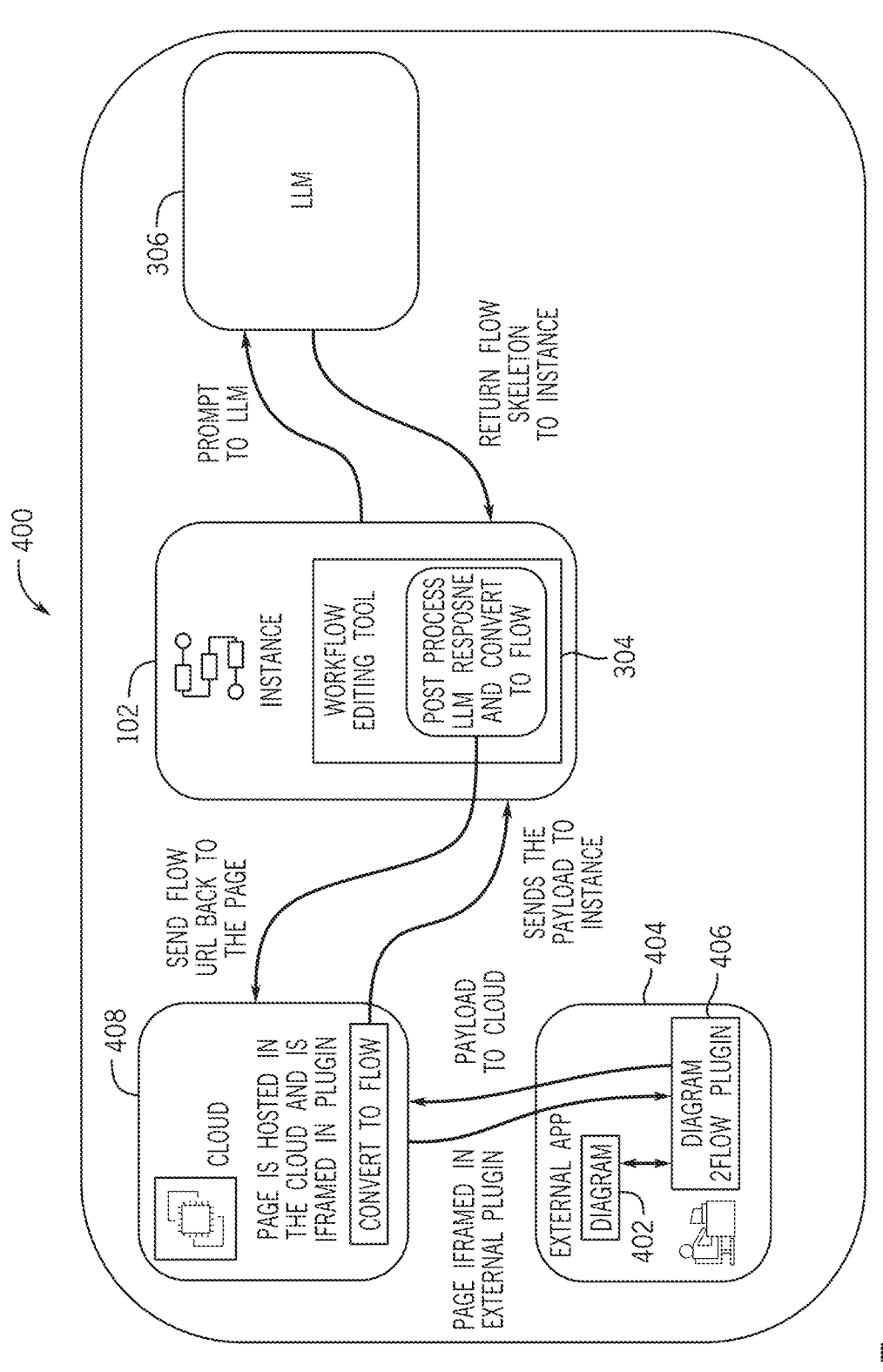
FIG. 5 is a schematic illustrating creation of a workflow based on a diagram created in an external application, in accordance with aspects of the present disclosure.

FIG. 5 is a schematic 400 illustrating creation of a workflow based on a diagram 402 created in an external source. As previously described, the diagram 402 may be created external to the client instance 102. For example, in the embodiment shown in FIG. 5, the diagram 402 is created in an external application 404 (e.g., a drawing application, a flow diagram design application, etc.) that runs outside of the client instance 102. For example, the application 404 may run on a client device or hosted on a server and rendered on a client device via a browser. In other embodiments, the diagram 402 may be a hand drawing (e.g., on a dry erase board, on a sheet of paper, etc.), or some other hand-generated representation of a diagram and captured in an image. A plugin 406 (e.g., a Diagram2Flow plugin) may receive the diagram 402, generate a payload of data that represents the diagram 402, and transmit the payload to the client instance 102. In some embodiments, transmission of the payload may be via an API of the external application 404. The payload may be in JSON or some other format, such as BPML, BPEL, and so forth. The payload may include a text description of the diagram that breaks the diagram into a series of chronological steps based on an analysis of the image. The text description of the payload may also include logical operations, notes about anomalies in the diagram, assumptions made, and so forth. In some embodiments, the payload may include the image or some other graphical representation of the diagram. In some embodiments, a cloud instance 408 may act as an intermediary between the external application 404 and the client instance 102, such that the cloud instance 408 may perform some processing of the payload (e.g., iframing the payload) before passing the payload to the client instance 102.

The client instance 102 receives the payload and converts the payload into an LLM prompt that, when provided to an LLM 306, causes the LLM 306 to generate a workflow based on the payload. For example, the client instance 102 may include a processing layer to convert or strip a JSON payload down to a minimal JSON payload (e.g., the smallest JSON payload that contains primary characteristics of the original JSON payload and enables the LLM 306 to generate a workflow from the minimal JSON payload that matches the diagram 402) or an otherwise compressed version of the JSON payload that is smaller in size than the original JSON payload. In some embodiments, the client instance 102 may utilize another LLM to convert the payload into a prompt that enables the LLM 306 to generate a workflow that matches the diagram 402.

The prompt is provided as an input to the LLM 306. As shown, the LLM 306 may be external to the client instance 102. For example, the LLM 306 may be hosted in the cloud, on a remote server, in another instance (e.g., a central instance), and so forth. However, in some embodiments, the LLM 306 may run inside of the client instance 102. The LLM 306 uses the prompt to generate a skeleton workflow populated with placeholder activities, which may or may not be grouped into stages, based on the received request. The LLMs 306 may build the skeleton workflow placeholder-activity-by-placeholder-activity, where each placeholder activity may include proposed placeholder values for one or more properties of the corresponding placeholder activity. For example, placeholder activities may include proposed placeholder values for inputs, outputs, actions that take place to generate the outputs based on the inputs, a label, a description, rules to apply during performance of the activity, triggers that initiate the activity, advanced properties of the activity, or any combination thereof.

The LLM 306 may be trained on existing workflows (e.g., within the enterprise, across an industry, across multiple industries, etc.), business process model and notation (BPMN) conventions, industry standard operating procedures, industry best practices, publicly available information, publications, data from the Internet, and so forth. In some embodiments, the LLM 306 may be an "off the shelf" or "out of the box" LLM provided by a service provider and not unique to the client instance 102 or the enterprise operating the client instance 102. However, in other embodiments, the LLM 306 may be customized to the client instance 102, either with specific training, specific customized settings, or both. In further embodiments, retrieval augmented generation (RAG) inputs may be provided for supporting custom actions and/or tables that are not part of the original model training.

The skeleton workflow is transmitted from the LLM 306 to the client instance 102. The client instance 102 post processes the skeleton workflow (e.g., via the workflow editing tool 304) to turn the skeleton workflow into a fully defined workflow. For example, the client instance 102 may utilize data from the payload to define parameters for placeholder values of the placeholder activities.

In some embodiments, the workflow editing tool 304 may receive inputs defining placeholder values of the placeholder activities or otherwise modifying the skeleton workflow. In some embodiments, a representation of the skeleton workflow may be transmitted to a client device for display. The client device may receive inputs modifying the workflow, which may be transmitted back to the client instance 102 for implementation. For example, the workflow editing tool 304 may receive inputs requesting modifications to or making edits to the skeleton workflow, and/or providing feedback to the workflow generation tool 304. Such modifications may include defining or editing properties of the one or more placeholder activities to convert the placeholder activities into fully defined activities, replacing placeholder activities with existing activities selected from a library or other workflow, replacing placeholder activities with new activities, removing placeholder activities, and so forth. The client instance 102 may iteratively update the skeleton workflow as inputs are received until an approval is received. Once an approval has been received, the client instance 102 generates a fully defined and operational workflow based on the skeleton workflow.

As shown in FIG. 5, in some embodiments, the workflow, or a uniform resource locator (URL) for the workflow may be transmitted back to the external application 404 via the plugin 406. The cloud instance 408 may or may not act as an intermediary between the client instance 102 and the external application 404. Accordingly, the workflow may be viewable, and in some cases even editable, in the external application 404. In some embodiments, two parallel instantiations of the workflow may exist, one on the client instance 102 and one in the external application 404. Accordingly, when modifications are made to an instantiation of the workflow on the client instance 102 or in the external application 404, updates may be transmitted to the external application 404 or the client instance 102 to synchronize the instantiations of the workflow such that the instantiations of the workflow match one another.

However, in other embodiments, the sole instantiation of the workflow may exist on the client instance 102. In such embodiments, the external application 404 may access the workflow via the URL. Accordingly, when modifications to the workflow (e.g., updates to the diagram 402 or some other representation of the workflow) are provided to the external application 404, updates may be transmitted to the client instance 102 via the plugin 406 as previously described with regard to the diagram 402. The cloud instance 408 may or may not act as an intermediary between the external application 404 and the client instance 102. In some embodiments, the client instance 102 may implement the updates to the workflow on the client instance 102. However, in some embodiments, the client instance 102 may utilize the LLM 306 by passing the updates to the LLM 306, or some processed version of the updates prepared by the client instance 102, and using the output of the LLM 306 to update the workflow. Correspondingly, when updates are made to the workflow on the client instance 102, the client instance may transmit the updates to the external application 404 via the plugin 406 such that the representation of the workflow within the external application 404 (e.g., the diagram 402) reflects the updates.

Figure 6:
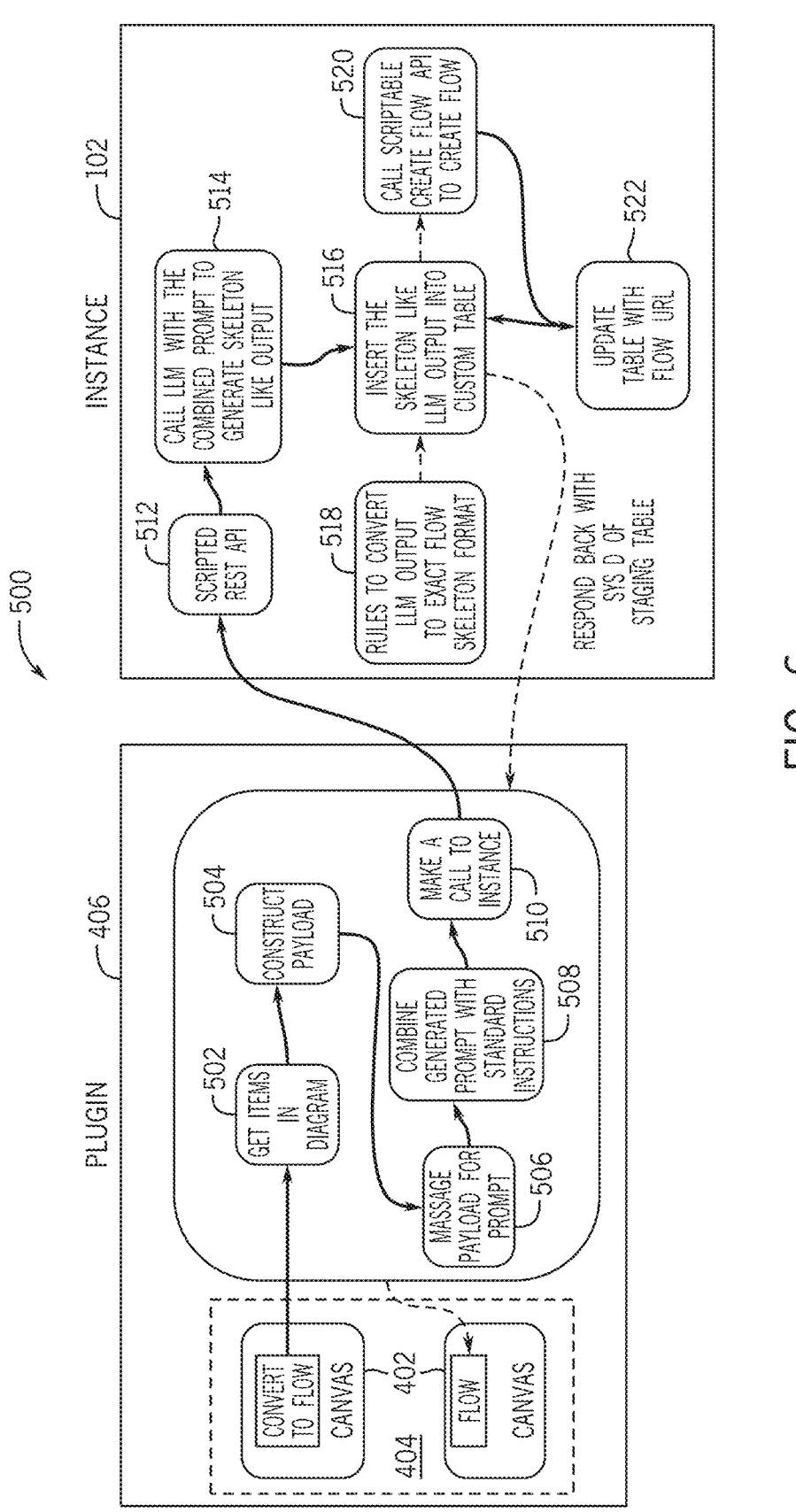
FIG. 6 is a flow chart illustrating communication between a plugin of the external application and the client instance in creating a workflow based on a diagram, in accordance with aspects of the present disclosure.

FIG. 6 is a flow chart 500 illustrating communication between the plugin 406 of the external application 404 and the client instance 102 in creating a workflow based on a diagram 402. As shown and previously described, the diagram 402 is created on a canvas of the external application 404. After a command is received to convert the diagram 402 to a workflow, at 502, the plugin 406 collects items from the diagram and indications of how the items are connected (e.g., arrows or other connectors). At 504, the plugin 406 assembles a payload based on the items in the diagram. As shown, in some embodiments, the plugin 406 may perform some processing on the payload to generate a prompt, or put the payload in a form that is better suited to converting to a prompt. Accordingly, at 506, the plugin 406 may massage (e.g., perform some processing on) the payload to generate an initial LLM prompt or for easier generation of an LLM prompt based on the payload. At 508, the generated prompt from 506 and the rest of the payload may be combined with standard instructions (e.g., "generate a workflow based on the accompanying data") to be provided to the LLM. At 510 a call is made to the client instance 102 by transmitting the payload to the client instance 102.

At 512 the client instance 102 receives the payload via a scripted REST API. As previously described, in some embodiments, the client instance 102 may perform some processing on the payload to generate a prompt for the LLM to generate a workflow based on the prompt and any accompanying data from the payload. At 514, the client instance 102 makes a call to the LLM by providing the prompt and any accompanying data requesting generation of a skeleton workflow as output. At 516, after receipt of the skeleton workflow-like output from the LLM, the client instance 102 inserts the output into a custom table. As shown, in some embodiments, at 518, the client instance may retrieve and apply one or more rules to convert the LLM output into a skeleton workflow format. At 520, the client instance 102 calls a scriptable API to create a workflow based on the skeleton workflow. As previously described, conversion of the skeleton workflow to a fully defined workflow may involve definition of various properties of placeholder activities in the skeleton workflow such that all of the properties of all of the activities in the skeleton workflow are defined. As 522, the custom table may be updated with a URL for the table. In some embodiments, the custom table may also be updated to reflect various properties of the workflow defined when the skeleton workflow was converted to a fully defined workflow. The custom table and/or the flow URL may then be transmitted from the client instance 102 back to the external application 404 via the plugin 406.

Figure 7:
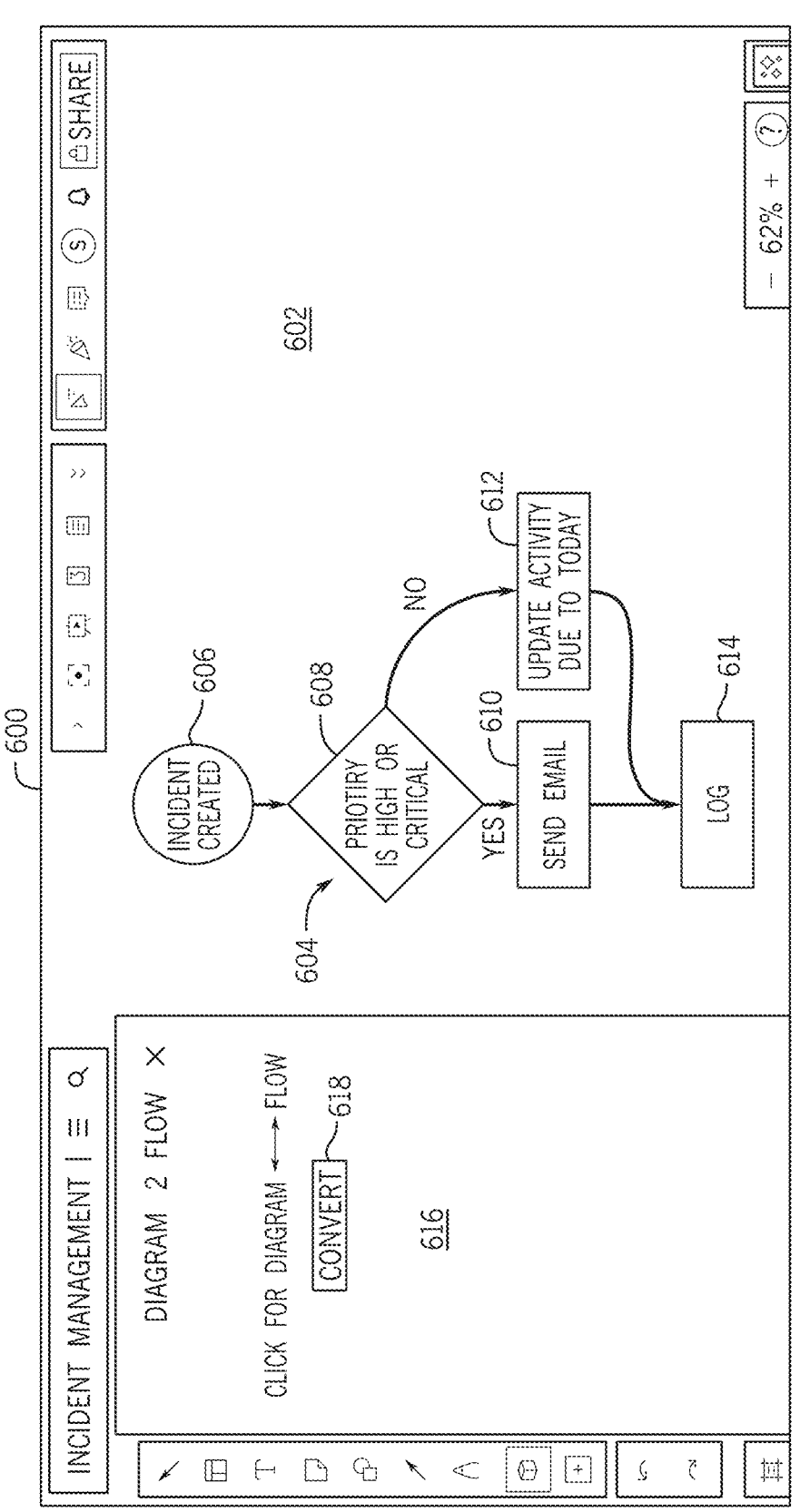
FIG. 7 is a screenshot of a GUI of the external application of FIGS. 5 and 6, including the diagram, in accordance with aspects of the present disclosure.
Figure 8:
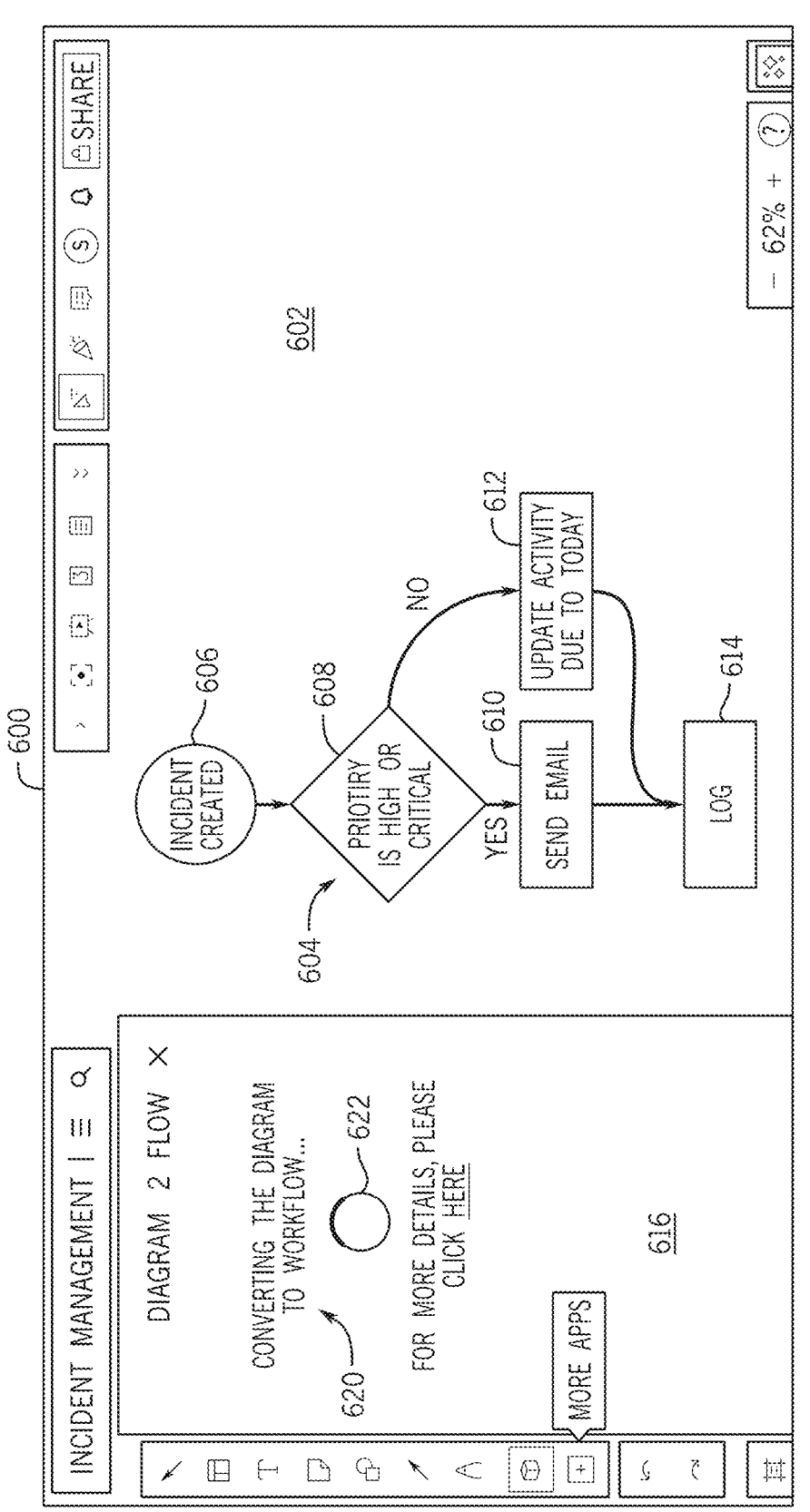
FIG. 8 is a screenshot of the GUI of FIG. 7 showing conversion of the diagram into the workflow, in accordance with aspects of the present disclosure.
Figure 9:
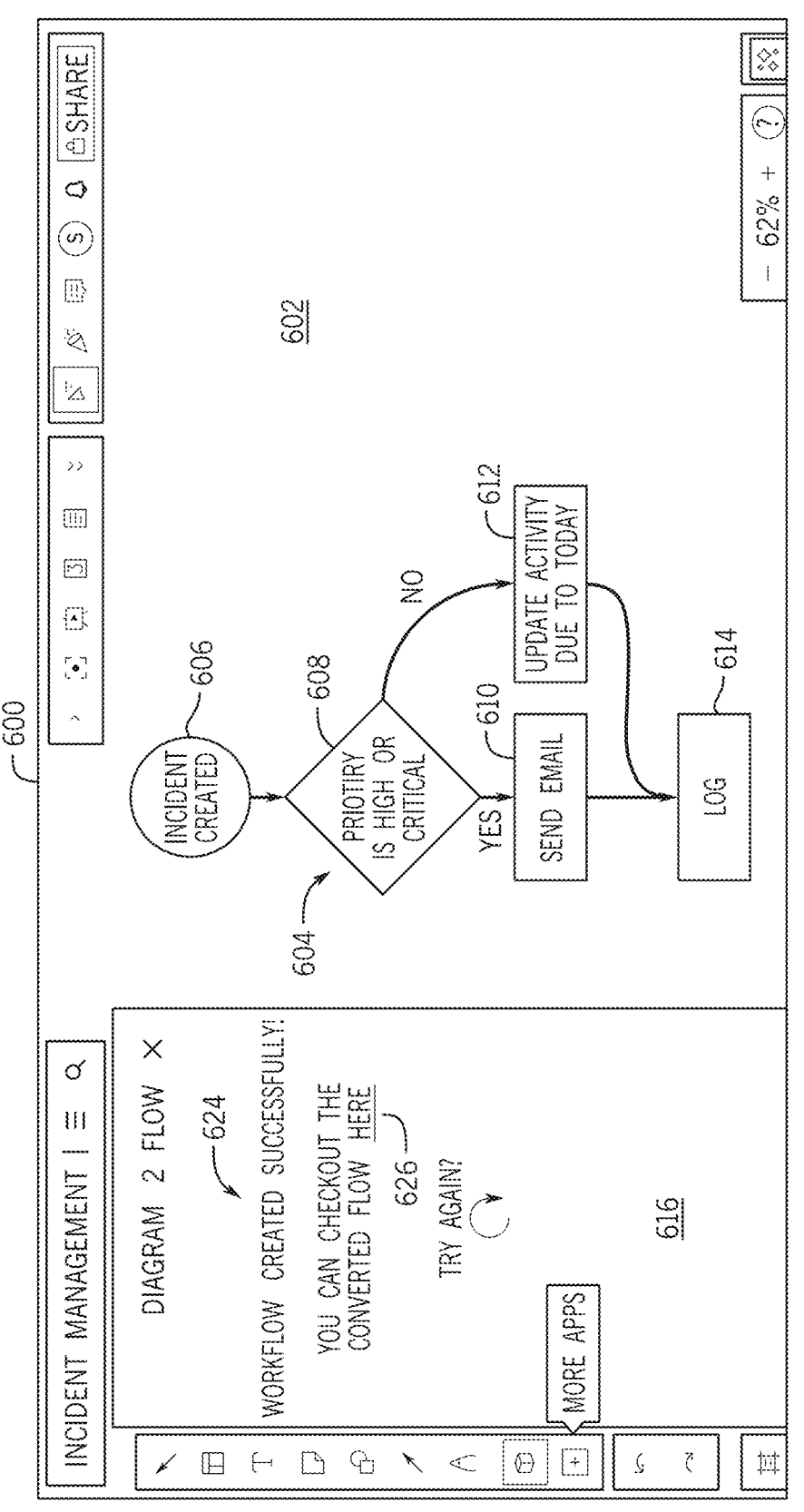
FIG. 9 is a screenshot of the GUI of FIGS. 7 and 8 showing that the workflow has been created and including a hyperlink to the workflow, in accordance with aspects of the present disclosure.

With the foregoing in mind, FIGS. 7-9 represent example screenshots of a GUI 600 of the external application of FIGS. 5 and 6. As shown in FIG. 7, the GUI 600 includes a canvas 602 on which a diagram 604 of an incident management workflow has been created. As shown, the diagram 604 includes an incident created block 606, a priority is high or critical decision block 608, a send email block 610, an update activity due to today block 612, and a log incident block 614. The various blocks 606, 608, 610, 612, 614 are joined by arrows indicating the flow as the workflow is performed. It should be understood, however, that the diagram 604 shown in FIG. 7 is merely an example, that other diagrams are envisaged, and that the disclosed techniques may be utilized with any other diagram. The GUI 600 also includes a window 616 for the diagram2flow plugin. Upon selection of the convert button 618 in the window 616, the diagram 604 will be converted to a workflow.

After the convert button 618 has been selected, as shown in FIG. 8, the window 616 updates to display a message indicating that the diagram 604 is being converted to a workflow. Further, a progress icon 622 may be displayed indicating the progress in converting the diagram 604 to the workflow. After creation of the workflow, as shown in FIG. 9, the window 616 may update with a message 624 indicating that the workflow has been created. The window 616 may also include a hyperlink 626 that, upon selection, opens the workflow in the client instance.

Figure 10:
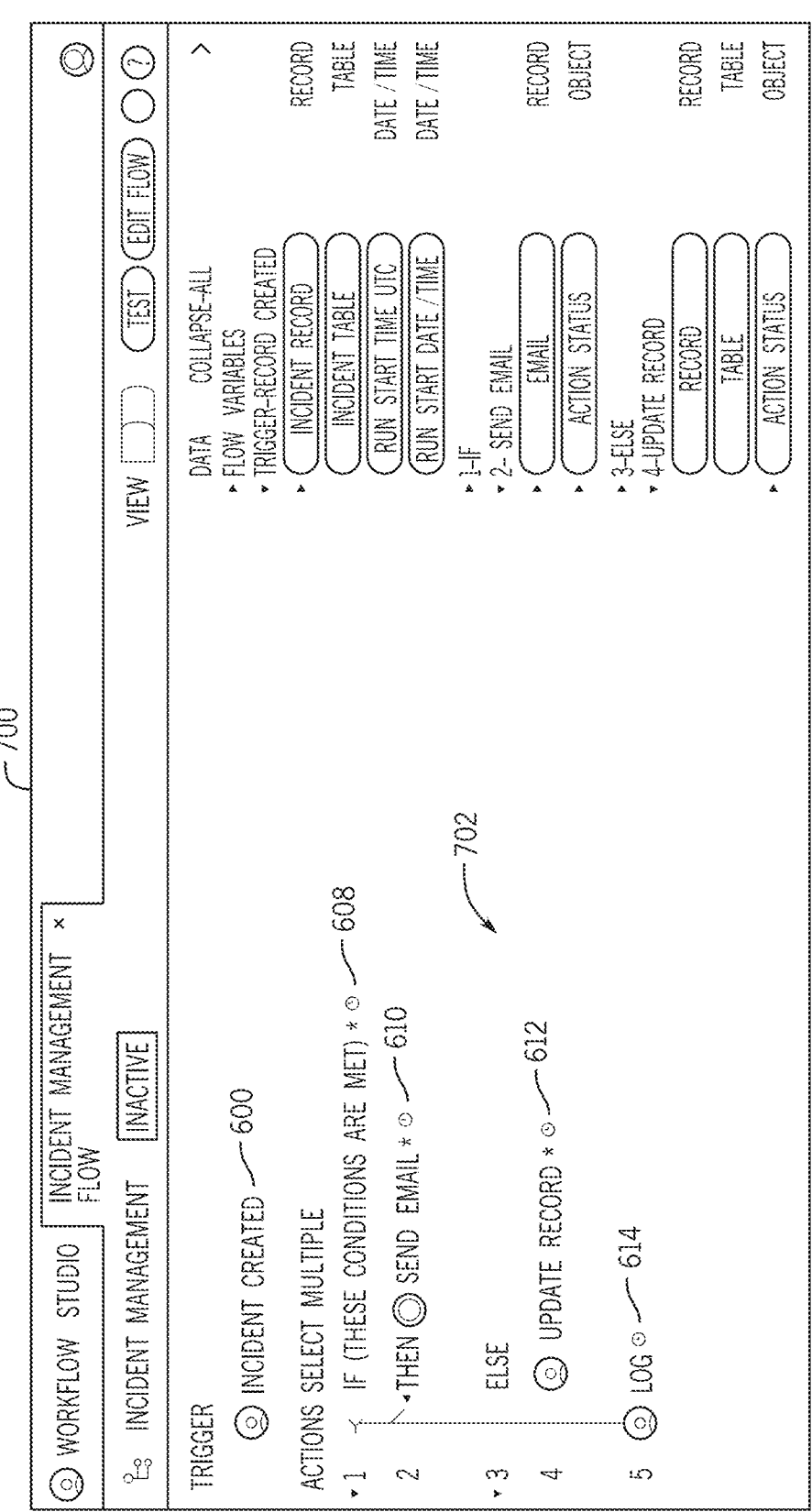
FIG. 10 is a screenshot of a GUI displaying the workflow accessible via the client instance upon selection of the hyperlink of FIG. 9, in accordance with aspects of the present disclosure.

FIG. 10 is a screenshot of a GUI 700 displaying the workflow 702 accessible via the client instance upon selection of the hyperlink 626 of FIG. 9. As shown, the workflow 702 has been created based on the diagram 604 created in the GUI shown in FIGS. 7-9. Specifically, the workflow includes an incident created step 606, a priority high or critical decision 608, a send email step 610, an update activity step 612, and a log step 614, similar to the diagram 604 shown in FIGS. 7-9, but in the form of a fully defined workflow in the client instance.

Figure 11:
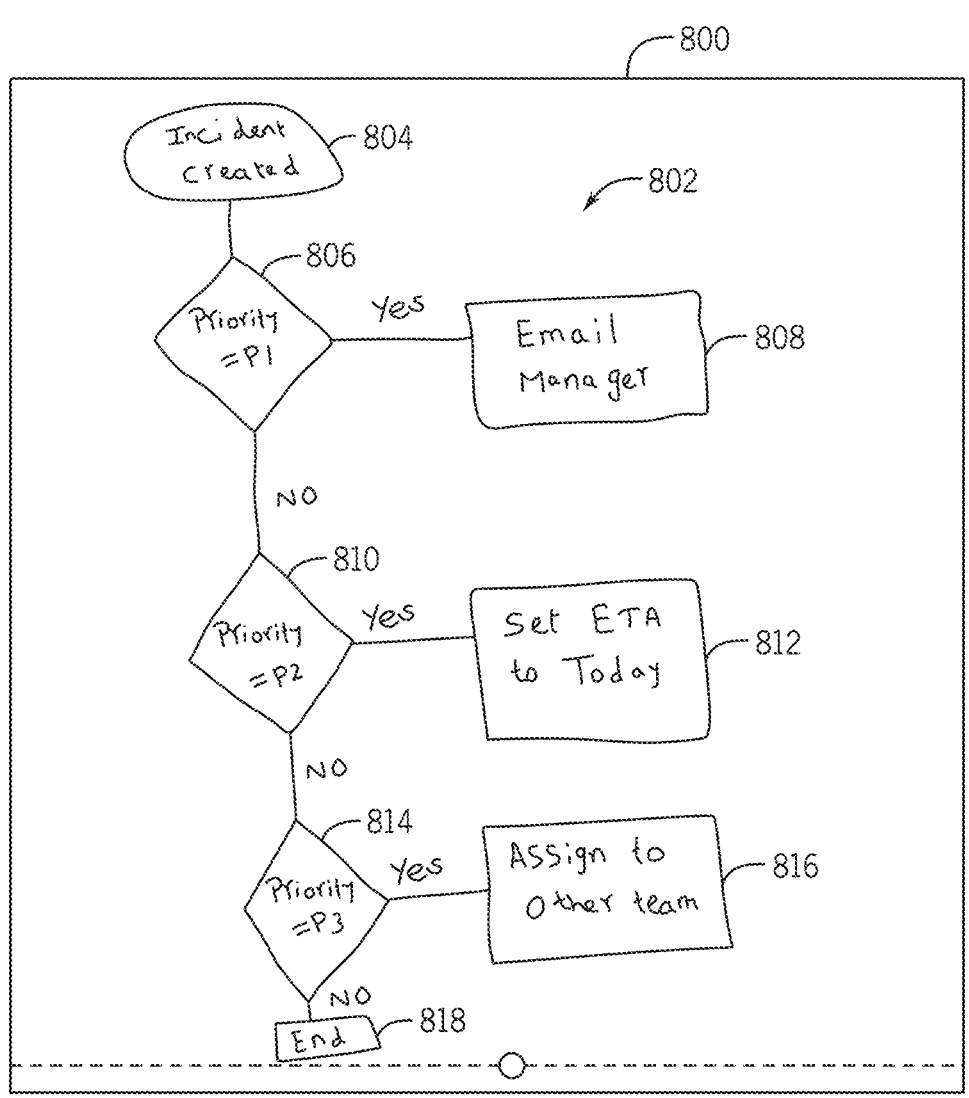
FIG. 11 is an image of a hand-drawn diagram to be converted into a new workflow, in accordance with aspects of the present disclosure.

As previously described, the disclosed techniques may be utilized to create workflows from diagrams beyond those created in external software application. For example, the disclosed techniques may be utilized to generate workflows based on hand-drawn diagrams or images of hand-drawn diagrams. FIG. 11 is an image of a hand-drawn diagram 802. As shown, at 804, an incident is created. At 806, if the priority of the incident is equal to P1, the manager is emailed (block 808). At 810, if the priority of the incident is equal to P2, the estimated time of arrival (ETA) of the incident is set to today (block 812). At 814, if the priority of the incident is equal to P3, the incident is assigned to another team (block 816). At block 818, the diagram 802 ends.

Figure 12:
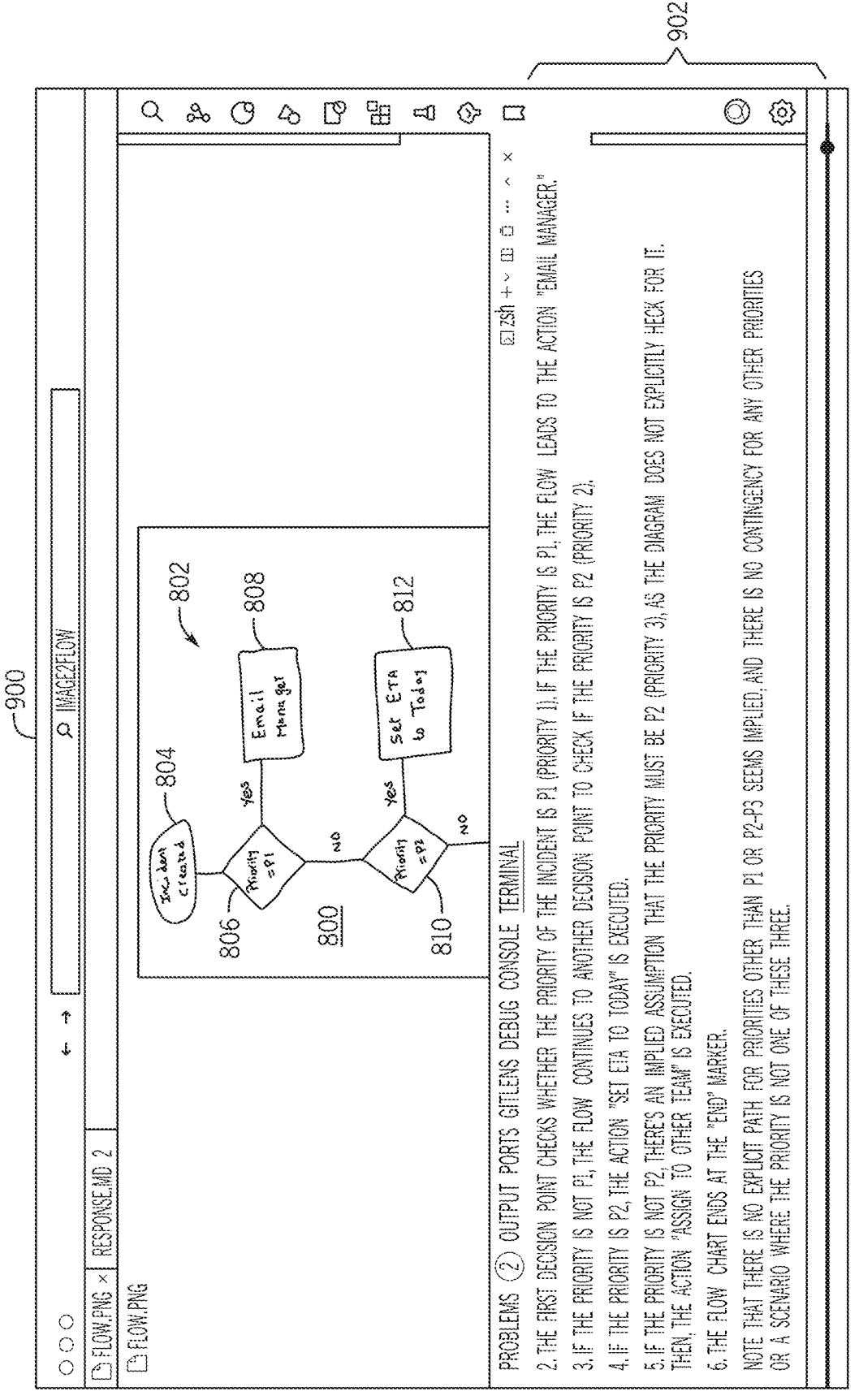
FIG. 12 is a screenshot of a terminal window accessing the client instance in which the image of FIG. 11 has been uploaded for conversion to the new workflow, in accordance with aspects of the present disclosure.

To convert the diagram 802 to a flow chart, the client instance may be accessed (e.g., via a terminal, a web browser, a native application, etc.), and the image 800 uploaded to the client instance. FIG. 12 is a screenshot of a terminal window 900 accessing the client instance in which the image 800 has been uploaded for conversion to a workflow. Upon receiving a command to convert the diagram 802 from the image 800 to a workflow, the client instance processes the diagram 802 from the image 800 and generates a payload 902 for the diagram 802. As shown, the payload may include a text description of the diagram 802 that breaks the diagram 802 into a series of chronological steps based on an analysis of the image. The text description of the payload 902 may also include logical operations, notes about anomalies in the diagram, assumptions made, and so forth. In some embodiments, the payload may include the image or some other graphical representation of the diagram.

Figure 13:
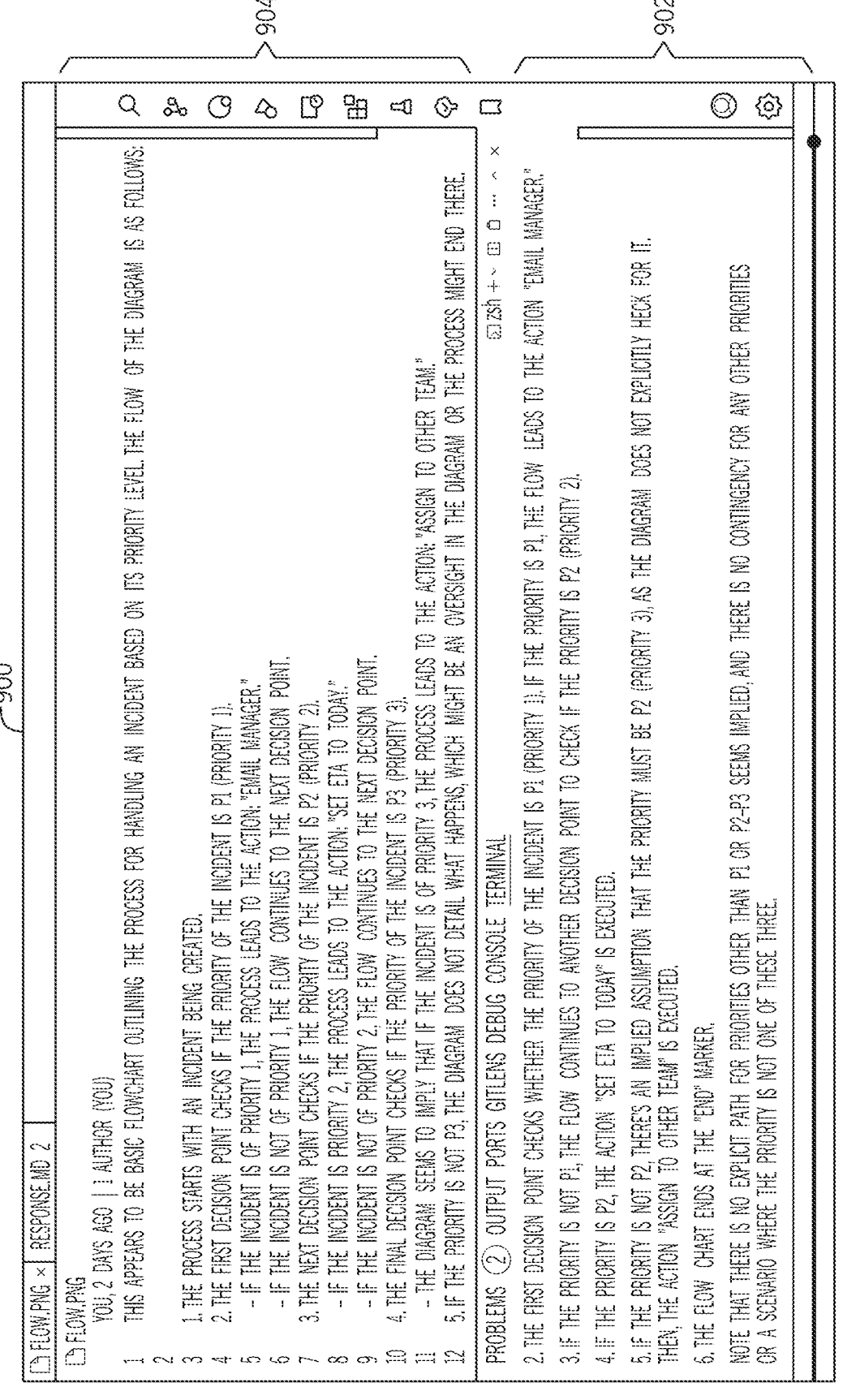
FIG. 13 is a screenshot of the terminal window of FIG. 12 displaying the new workflow, in accordance with aspects of the present disclosure.

As previously described, the client instance uses the payload 902 to generate a prompt to be provided to an LLM, which outputs a skeleton workflow. The client instance uses the payload, and in some cases may refer back to the image 800 of the diagram 802, to define properties of the placeholder activities of the skeleton workflow, resulting in a fully defined workflow. After the fully defined workflow has been generated, as shown in FIG. 13, the terminal window 900 may be updated to display the fully defined workflow 904, or a representation of the fully defined workflow 904.

Figure 14:
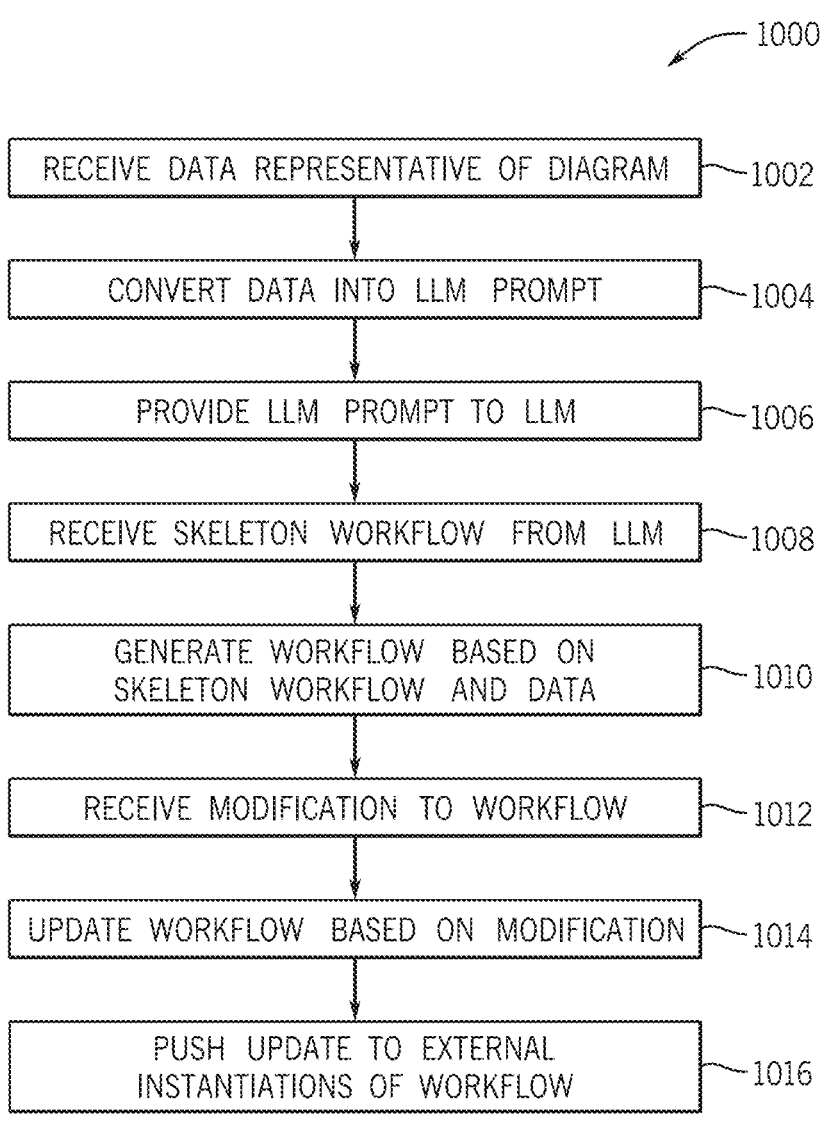
FIG. 14 is a flow chart of a process for generating the workflow based on the diagram, in accordance with aspects of the present disclosure.

FIG. 14 is a flow chart of a process 1000 for generating a workflow based on a diagram. At block 1002, the process 1000 receives data representative of a diagram. As previously described, the data may be the diagram itself, a payload generated based on the diagram, additional data, or some combination thereof. The workflow may represent any process carried out in the operation of an enterprise or organization. For example, the workflow may be related to incident management, credit card fraud investigation, employee onboarding, employee training, accounting, financial close, employee reviews, product testing, invoicing/billing, quality control, IT security, purchasing, inventory, logistics, employee benefit management, software development, supply chain management, vendor onboarding, and so forth.

At 1004, the process 1000 converts the received data into an LLM prompt that, when provided to an LLM, causes the LLM to generate a skeleton workflow based on the prompt. In some embodiments, converting the received data to a prompt may involve stripping a JSON payload down to a minimal JSON payload (e.g., the smallest JSON payload that contains primary characteristics of the original JSON payload and enables the LLM to generate a workflow from the minimal JSON payload that matches the diagram) or an otherwise compressed version of the JSON payload that is smaller in size than the original JSON payload. In some embodiments, the process 1000 may utilize another LLM to convert the received data into a prompt that enables the LLM to generate a skeleton workflow corresponding to the diagram. Whereas a diagram could not previously by provided as an input to an LLM for the LLM to generate a workflow, conversion of the received data (e.g., based on a diagram) into an LLM prompt allows the LLM to generate a skeleton workflow based on a diagram created by a user profile and also provides more context to the LLM than a user-generated prompt. This results in faster, more efficient creation or workflows, outputs from the LLM that are better defined and closer to the intended workflow than was previously possible. Further, because the disclosed techniques use a more holistic approach to generating workflows compared to workflows generated based on inputs from multiple profiles or personas having different perspectives, as well as different levels and combinations of permissions, the disclosed techniques result in workflows that are more resource efficient to execute.

At 1006, the prompt is provided to the LLM. The LLM generates a skeleton workflow populated with placeholder activities, which may or may not be grouped into stages, based on the received prompt. The LLM may build the skeleton workflow placeholder-activity-by-placeholder-activity. Each placeholder activity may include proposed placeholder values for one or more properties of the corresponding placeholder activity. For example, placeholder activities may include proposed placeholder values for inputs, outputs, actions that take place to generate the outputs based on the inputs, a label, a description, rules to apply during performance of the activity, triggers that initiate the activity, advanced properties of the activity, or any combination thereof.

The LLM may be trained on existing workflows (e.g., within the enterprise, across an industry, across multiple industries, etc.), business process model and notation (BPMN) conventions, industry standard operating procedures, industry best practices, publicly available information, publications, data from the Internet, and so forth. In some embodiments, the one or more LLMs may be "off the shelf" or "out of the box" LLMs provided by a service provider and not unique to the client instance. However, in other embodiments, the LLMs may be customized to the client instance, either with specific training, specific customized settings, or both.

At 1008, the process 1000 receives the skeleton workflow from the LLM. At 1010, the process 1000 generates a fully defined workflow based on the skeleton workflow and the received data. For example, the process 1000 may use the received data to define or otherwise specify properties of placeholder activities by confirming the placeholder values, replacing placeholder values with other values, and/or defining properties of placeholder activities that may have been left undefined. Once each property for each placeholder activity is fully defined, the workflow is considered a fully defined workflow.

At 1012, the process 1000 may receive inputs modifying the workflow. For example, the process 1000 may receive inputs requesting modifications to or making edits to a workflow, and/or providing feedback via a workflow editing tool. Such modifications may include redefining or editing properties of the one or more activities, replacing activities with activities selected from a library or other workflow, replacing activities with new activities, removing activities, and so forth.

In some embodiments, modifications may be received from external sources, such as the external application. In such embodiments, modifications may be received in the same or similar form as received from the external software application. However, in other embodiments, the modifica- tions may be received in a payload, in which case modifi- cations may be implemented by the client instance. Imple- mentation of modifications by the client instance may include merely implementing received modifications. How- ever, in some embodiments, the client instance may perform processing on the payload, as with the payload received for the original generation of the workflow. Accordingly, one or more LLMs (e.g., running within or external to the client instance) may be used to process the payload, extract modifications, and in some cases even implement the modi- fications.

At 1014, the workflow is updated based on the inputs received. In some embodiments, updating the workflow may include merely implementing specific edits received, whereas in other embodiments, updating the workflow may include receiving and interpreting less explicit inputs (e.g., "can this be displayed as a chart?"), and/or a chat exchange and determining how to update the workflow. Receiving feedback/modifications and updating the workflow may continue iteratively until approval of the workflow is received (e.g., from a workflow designer profile). At 1016, modifications made to the workflow may be packaged as updates and transmitted to external instantiations of the workflow in order to synchronize the external instantiations of the workflow. Accordingly, updates may be transmitted to the external application via the plugin and the instantiation of the diagram within the external application may be modified based on the update to match the instantiation of the workflow instantiated in the client instance.

The presently disclosed techniques are directed to a workflow editing tool that builds workflows using large language models (LLMs) based on diagrams received from sources external to a client instance running the workflow editing tool. Specifically, a payload representative of a diagram is received from a source external to the client instance (e.g., via an API or a plugin). The payload may be in the form of JSON, text, images, and so forth. The client instance applies a processing layer to convert the payload into a text-based (e.g., natural language) LLM prompt and provides the prompt to an LLM. In some embodiments, conversion of the payload to an LLM prompt may involve an additional LLM, such as when the payload includes one or more images. The LLM generates a skeleton workflow, including multiple placeholder activities, which may or may not be grouped into stages, based on the prompt. The client instance converts the skeleton workflow into a workflow by specifying various characteristics of the placeholder activi- ties based on the characteristics of the payload. The work- flow may be in JSON, BPML, BPEL, or some other format. The workflow may then appear as a usable workflow in the client instance. Further, the workflow may be exported to the external source such that the workflow may be viewed and/or modified in one or more applications running on the external source. Accordingly, the workflow in the client instance and the external source may be synchronized such that workflow modifications in the client instance are syn- chronized to the workflow instantiated on the external source, and workflow modifications in the external source are synchronized to the workflow instantiated on the client instance.

Use of the disclosed techniques may result in faster and more computationally efficient creation of workflows, as well as more accurate workflows with fewer errors. Further, because the disclosed techniques use a more holistic approach to generating workflows compared to workflows generated based on inputs from multiple profiles or personas having different perspectives, as well as different levels and combinations of permissions, the disclosed techniques result in workflows that are more resource efficient to execute.

The specific embodiments described above have been shown by way of example, and it should be understood that these embodiments may be susceptible to various modifi- cations and alternative forms. It should be further under- stood that the claims are not intended to be limited to the particular forms disclosed, but rather to cover all modifica- tions, equivalents, and alternatives falling within the spirit and scope of this disclosure.

The techniques presented and claimed herein are refer- enced and applied to material objects and concrete examples of a practical nature that demonstrably improve the present technical field and, as such, are not abstract, intangible or purely theoretical. Further, if any claims appended to the end of this specification contain one or more elements desig- nated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method comprising:
receiving a structured payload representative of a dia- gram;
converting the structured payload to a large language model (LLM) prompt by compressing the structured payload to a compressed structured payload, wherein the compressed structured payload is smaller in size than the structured payload, but maintains a set of characteristics of the structured payload;
providing the LLM prompt to an LLM;
receiving, from the LLM, based on the LLM prompt, a skeleton workflow, wherein the skeleton workflow includes a placeholder activity, and wherein the place- holder activity includes a placeholder value for a prop- erty of the placeholder activity;
generating a workflow based on the skeleton workflow and the structured payload, wherein generating the workflow includes defining the placeholder value for the property of the placeholder activity based on the structured payload by confirming the placeholder value with the structured payload or replacing the placeholder value with a new value; and
executing the workflow.

2. The method of claim 1, wherein the method is per- formed by a client instance and wherein the structured payload is received from a source external to the client instance.

3. The method of claim 2, wherein the source external to the client instance comprises a flow diagram design software application.

4. The method of claim 2, further comprising transmitting the workflow to the source external to the client instance.

5. The method of claim 4, further comprising:

receiving, from the source external to the client instance, a modification to the workflow; and updating the workflow based on the modification.

6. The method of claim 4, further comprising:

receiving an input comprising a modification to the workflow;

updating the workflow based on the modification; and transmitting the modification to the source external to the client instance.

7. The method of claim 1, wherein the structured payload representative of the diagram comprises an image, and wherein converting the structured payload to the LLM prompt comprises:

providing the structured payload to an additional LLM; and receiving the LLM prompt from the additional LLM.

8. The method of claim 1, wherein the property of the placeholder activity comprises an input to the placeholder activity, an output of the placeholder activity, one or more actions that take place to generate the output of the placeholder activity based on the input to the placeholder activity, a label of the placeholder activity, a description of the placeholder activity, a rule to apply during performance of the placeholder activity, a trigger that initiates the placeholder activity, or an advanced property of the placeholder activity.

9. The method of claim 1, wherein the LLM is trained on one or more other workflows, one or more business process model and notation (BPMN) conventions, one or more industry standard operating procedures, one or more industry best practices, one or more publications, or any combination thereof.

10. A system, comprising:

processing circuitry; and a memory, accessible by the processing circuitry, and storing instructions that, when executed by the processing circuitry, cause the processing circuitry to execute a client instance, wherein the client instance is configured to perform operations comprising:

receiving, from a source external to the client instance, a structured payload representative of a diagram;

converting the structured payload to a large language model (LLM) prompt by compressing the structured payload to a compressed structured payload, wherein the compressed structured payload is smaller in size than the structured payload, but maintains a set of characteristics of the structured payload;

providing the LLM prompt to an LLM;

receiving, from the LLM, based on the LLM prompt, a skeleton workflow, wherein the skeleton workflow includes a placeholder activity, and wherein the placeholder activity includes a placeholder value for a property of the placeholder activity;

generating a workflow based on the skeleton workflow and the structured payload, wherein generating the workflow includes defining the placeholder value for the property of the placeholder activity based on the structured payload by confirming the placeholder value with the structured payload or replacing the placeholder value with a new value; and transmitting a representation of the workflow to the source external to the client instance.

11. The system of claim 10, wherein the structured payload representative of the diagram comprises a payload generated by a plugin of the source external to the client instance based on the diagram, wherein the payload comprises a text description of the diagram.

12. The system of claim 11, wherein the payload comprises a JavaScript Object Notation (JSON) file.

13. The system of claim 12, wherein converting the structured payload to the LLM prompt comprises converting the payload to a minimal JSON file, wherein the minimal JSON file is smaller in size than the payload.

14. A non-transitory, computer readable medium comprising instructions that, when executed by processing circuitry, cause the processing circuitry to perform operations comprising:

receiving a structured payload representative of a diagram;

converting the structured payload to a large language model (LLM) prompt by compressing the structured payload to a compressed structured payload, wherein the compressed structured payload is smaller in size than the structured payload, but maintains a set of characteristics of the structured payload;

providing the LLM prompt to an LLM;

receiving, from the LLM, based on the LLM prompt, a skeleton workflow, wherein the skeleton workflow includes a placeholder activity, and wherein the placeholder activity includes a placeholder value for a property of the placeholder activity;

generating a workflow based on the skeleton workflow and the structured payload, wherein generating the workflow includes defining the placeholder value for the property of the placeholder activity based on the structured payload by confirming the placeholder value with the structured payload or replacing the placeholder value with a new value; and executing the workflow.

15. The non-transitory, computer readable medium of claim 14, wherein the structured payload representative of the diagram comprises an image of the diagram.

16. The non-transitory, computer readable medium of claim 14, wherein processor is configured to execute a client instance, and wherein the structured payload representative of the diagram is received from a source external to the client instance.

17. The non-transitory, computer readable medium of claim 16, wherein the structured payload representative of the diagram comprises a payload generated by a plugin of the source external to the client instance based on the diagram, wherein the payload comprises a text description of the diagram.

18. The non-transitory, computer readable medium of claim 17, wherein the payload comprises a JavaScript Object Notation (JSON) file.

19. The non-transitory, computer readable medium of claim 16, wherein the source external to the client instance comprises a flow diagram design software application.

20. The non-transitory, computer readable medium of claim 16, wherein the operations further comprise transmitting a representation of the workflow to the source external to the client instance.

* * * * *